United States Patent [19]
Yu

[11] Patent Number: 6,095,601
[45] Date of Patent: Aug. 1, 2000

[54] BASE OF BICYCLE SADDLE

[76] Inventor: Tsai-Yun Yu, No. 1-2, Lane 1147, Sec. 1, Chung San Road, Ta Chia Chen, Taichung Hsien, Taiwan

[21] Appl. No.: 09/333,956

[22] Filed: Jun. 16, 1999

[51] Int. Cl.[7] ....................................................... B62J 1/00
[52] U.S. Cl. ...................... 297/215.16; 297/202; 297/214
[58] Field of Search ............................... 297/215.16, 214, 297/202

[56] References Cited

U.S. PATENT DOCUMENTS

| | | | |
|---|---|---|---|
| 1,975,405 | 10/1934 | Pryale | 297/215.16 |
| 5,203,607 | 4/1993 | Landi | 297/214 |
| 5,348,369 | 9/1994 | Yu . | |
| 5,823,618 | 10/1998 | Fox et al. | 297/214 |

Primary Examiner—Anthony D. Barfield
Attorney, Agent, or Firm—Browdy and Neimark

[57] ABSTRACT

A bicycle saddle has a base which is formed of a main body and an elastic body. The main body is provided with a shock-absorbing area which is in turn provided with a plurality of receiving spaces, and partitions located between the receiving spaces. Each receiving space has a shoulder portion located along the periphery thereof such that the shoulder portion is beneath the level of the top of the shock-absorbing area. The partitions and the shoulder portions are level with each other and are provided with a plurality of through holes. The elastic body is filled in the shock-absorbing area by molding such that the elastic body is anchored securely in the through holes and that the elastic body covers the shoulder portions, and the top and the bottom of the partitions.

3 Claims, 3 Drawing Sheets

BASE OF BICYCLE SADDLE

FIELD OF THE INVENTION

The present invention relates generally to a bicycle saddle, and more particularly to a base of the bicycle saddle.

BACKGROUND OF THE INVENTION

U.S. Pat. No. 5,348,369 discloses an improved bicycle saddle comprising a base which is provided in the rear end portion thereof with two spaces in each of which spaces an elastomer is provided. The spaces are provided in the wall thereof with a plurality of insertion holes for engaging the nails of a protuberance of the elastomer. The bicycle saddle is capable of absorbing shock; nevertheless it has drawbacks. The elastomer is projected from the saddle, thereby making the saddle rather uncomfortable to sit on. In addition, the engagement of the nails with the insertion holes is a labor-intensive work. Moreover, the nails are vulnerable to breakage.

SUMMARY OF THE INVENTION

The primary objective of the present invention is to provide an improved bicycle saddle free from the drawbacks of the prior art bicycle saddle.

It is another objective of the present invention to provide an improved bicycle saddle which is superior in shock-absorbing capability to the prior art bicycle saddle.

In keeping with the principle of the present invention, the foregoing objectives of the present invention are attained by an improved bicycle saddle having a base which comprises a main body. The main body is made of a rigid plastic material and is provided with a shock-absorbing area which is in turn provided with an elastic body. The elastic body is made of a plastic material having a rigidity less than the rigidity of the plastic material of which the main body is made. The shock-absorbing area is provided with a plurality of receiving spaces and a plurality of partitions located between the spaces. Each receiving space is provided in the peripheral edge thereof with a circular shoulder portion coplanar with the top of each partition. The shoulder portion and the partition are provided with a plurality of through holes. The shoulder portions and the partitions are enclosed by the periphery of the elastic body. The top of the elastic body is coplanar with the top of the main body so as to provide a bicyclist with sitting comfort. In addition, the elastic body is held in the main body by the through holes of the shoulder portion and the partition.

The foregoing objectives, features, functions, and advantages of the present invention will be more readily understood upon a thoughtful deliberation of the following detailed description of the embodiments of the present invention with reference to the accompanying drawings.

DETAILED DESCRIPTION OF THE INVENTION

Figure 1:
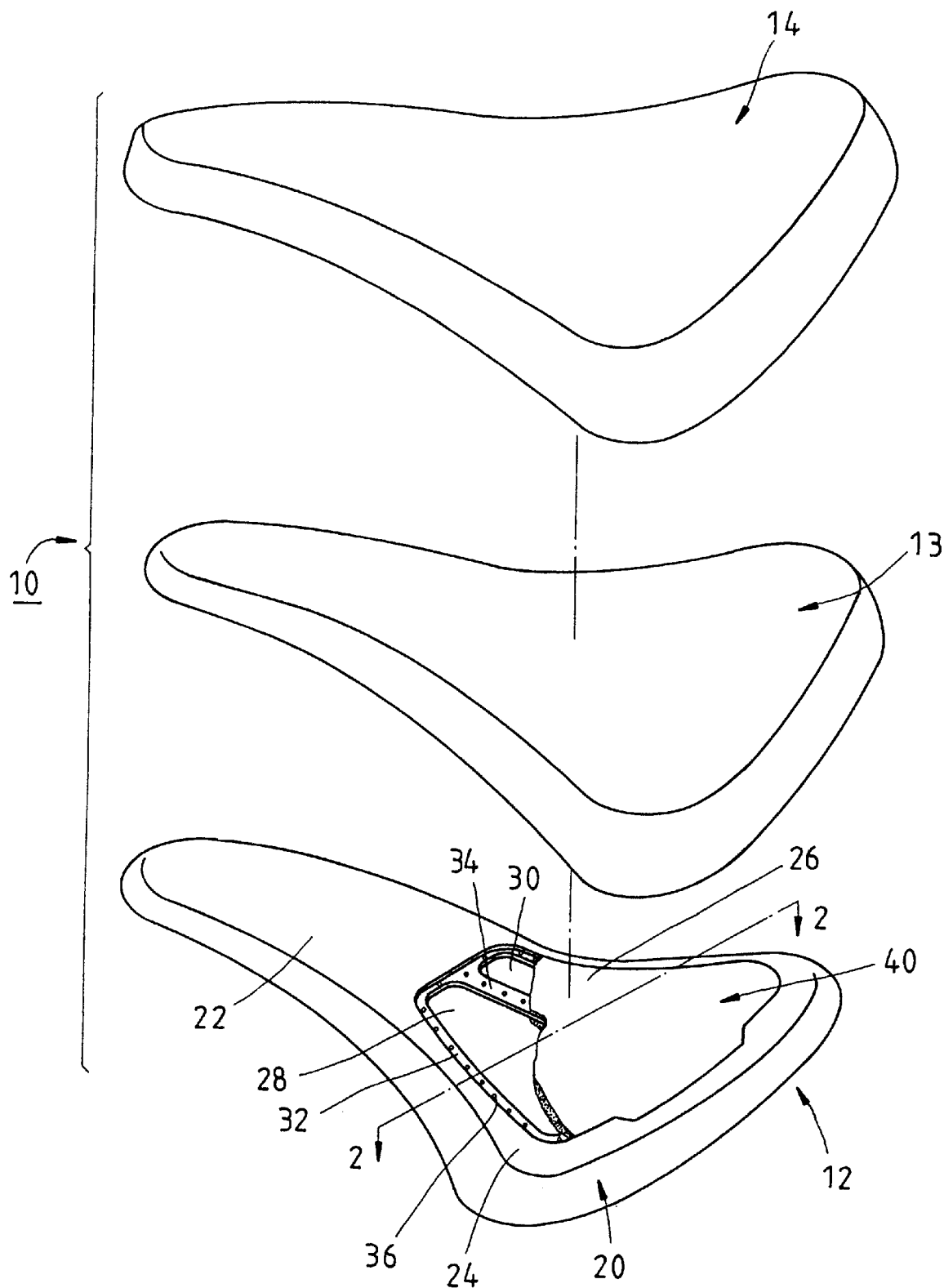
FIG. 1 shows an exploded view of a first preferred embodiment of the present invention.
Figure 2:
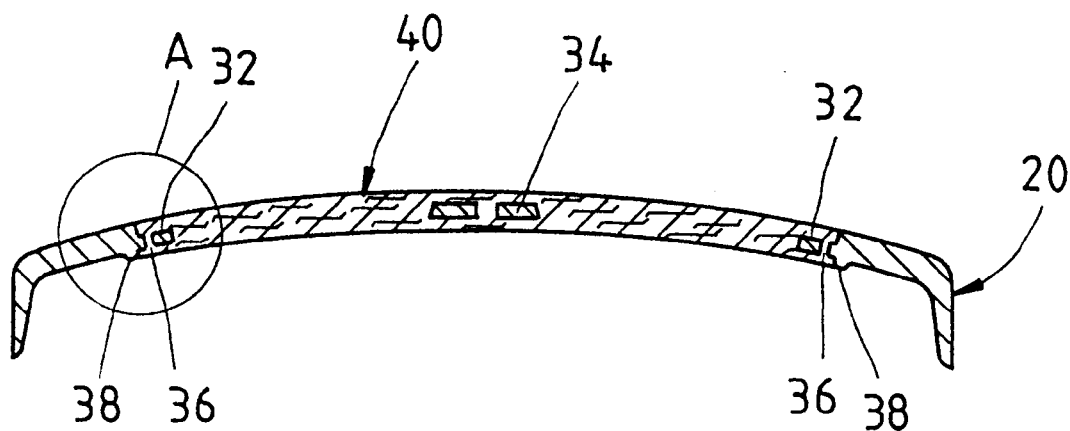
FIG. 2 shows a sectional view of a portion taken along the direction indicated by a line 2—2 as shown in FIG. 1.
Figure 3:
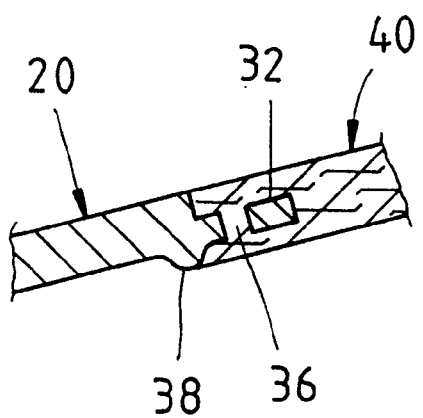
FIG. 3 shows an enlarged view of a portion indicated by a circle "A" as shown in FIG. 2.

As shown in FIGS. 1–3, a bicycle saddle 10 embodied in the present invention is formed of a base 12, a middle pad 13, and a cover 14. The middle pad 13 is made of a foam material. The base 12 is covered by the middle pad 13 which is in turn shielded by the cover 14.

The base 12 of the first preferred embodiment of the present invention is formed of a main body 20 and an elastic body 40.

The main body 20 is made of a rigid plastic material by molding. The main body 20 is shaped in such a manner that it has a front end 22 and a rear end 24 which is wider than the front end 22. The main body 20 is about 3.55 mm in thickness and is provided with a shock-absorbing area 26 which is located in the rear end 24 such that the shock-absorbing area 26 corresponds in location to the buttocks of a bicyclist. The shock-absorbing area 26 has two receiving spaces 28 and 30, and a circular shoulder portion 32 circumventing the two receiving spaces 28 and 30 such that the circular shoulder portion 32 is located about 0.75 mm beneath the level of the top of the shock-absorbing area 26. Located between the two receiving spaces 28 and 30 is a partition 34 which is coplanar with the shoulder portion 32 and is about 2 mm in thickness. The shoulder portion 32 and the partition 34 are provided with a plurality of through holes 36 which are arranged at an interval. The main body 20 is provided in the underside thereof with two protruded edges 38 which are located respectively in the periphery of the two receiving spaces 28 and 30.

The elastic body 40 is made of a soft plastic material by molding and is received in the shock-absorbing area 26 such that the shoulder portion 32 and the partition 34 are covered by the elastic body 40, and that the top of the elastic body 40 is level with the top of the main body 20, and further that the underside of the elastic body 40 is level with the underside of the main body 20, and further that the elastic body 40 is anchored in the through holes 36 in light of the elastic body 40 being formed in the shock-absorbing area 26 by molding. The elastic body 40 of the first preferred embodiment of the present invention has a central area with a thickness of 5.5 mm or so. The partition 34 is about 2 mm in thickness. The thickness covering the top and the bottom of the partition 34 is in the range of 1.5 mm–2.0 mm. The shoulder portion 32 is about 1 mm in thickness. The thickness covering the top and the bottom of the shoulder portion 32 is about 0.75 mm. In light of the top of the elastic body 40 being level with the top of the main body 20, the bicycle saddle of the present invention is comfortable to sit on. In addition, the shock-absorbing area 26 is filled with the elastic body 40 by molding, the elastic body 40 is anchored securely in the through holes 36. It is therefore readily apparent that the bicycle saddle of the present invention is free from the drawbacks of the bicycle saddle of the prior art.

Figure 4:
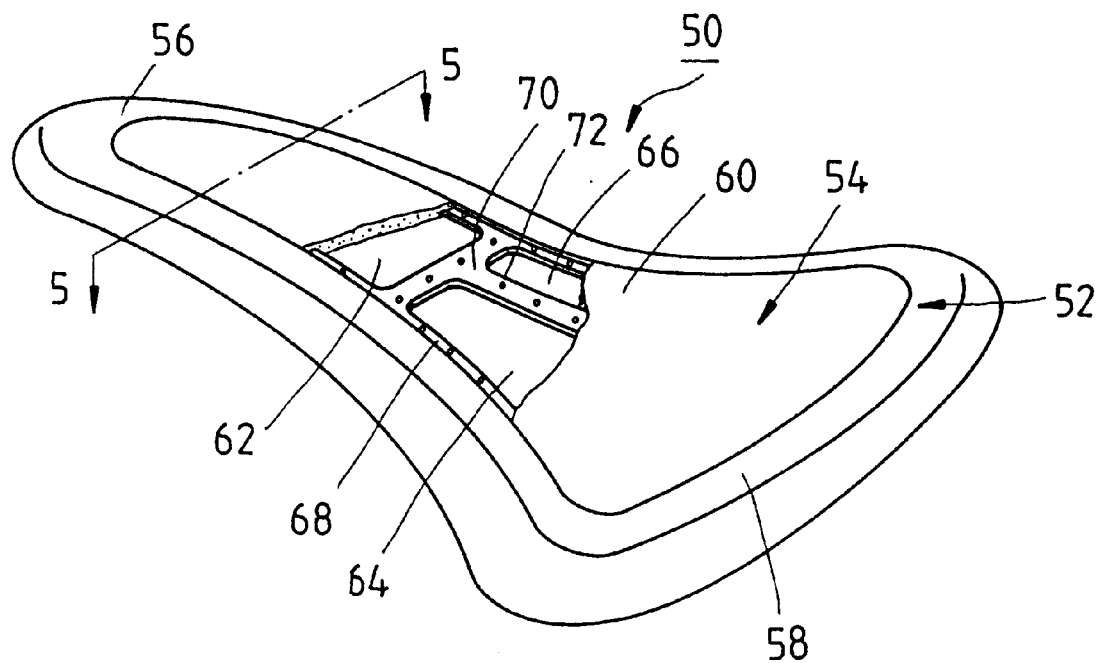
FIG. 4 shows a schematic view of a second preferred embodiment of the present invention.
Figure 5:
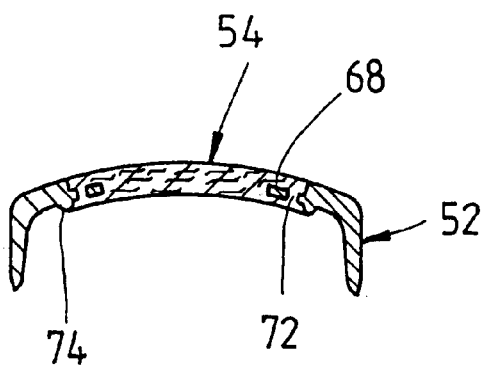
FIG. 5 shows a sectional view of a portion taken along the direction indicated by a line 5—5 as shown in FIG. 4.

As shown in FIGS. 4 and 5, a saddle base 50 of the second preferred embodiment of the present invention has a main body 52 and an elastic body 54.

The main body 52 is made of a rigid plastic material and is provided with a front end 56 and a rear end 58 wider than the front end 56. The main body 52 is provided in the top thereof with a shock-absorbing area 60 corresponding in shape to the top of the main body 52 and having a front receiving space 62 located in the front end 56, and two rear receiving spaces 64 and 66 located in the rear end 58. The receiving spaces are provided in the periphery thereof with a circular shoulder portion 68 which is about 0.75 mm beneath the level of the top of the main body 52. Located between the receiving spaces is a T-shaped partition 70 which has a top level with the shoulder portion 68. The shoulder portion 68 and the partition 70 are provided with a plurality of through holes 72. The main body 52 is provided in the underside thereof with a plurality of protruded edges 74 which are equal in number to the receiving spaces and are located at the peripheries of the receiving spaces.

The elastic body 54 is made of a soft plastic material and is filled in the shock-absorbing area 60 by molding such that the elastic body 54 is anchored securely in the through holes 72, and that the elastic body 54 covers the top and the bottom of the partition 70, as well as the shoulder portion 68.

What is claimed is:

1. A base of a bicycle saddle, said base comprising:

a main body made of a rigid plastic material and provided with a front end and a rear end wider than said front end whereby said rear end is provided with a shock-absorbing area, said shock-absorbing area having a front receiving space located in said front end, two rear receiving spaces located in said rear end a circular shoulder portion circumventing each of said receiving spaces such that said shoulder portion is located beneath the level of a top of said shock-absorbing area, and a T-shaped partition located between said receiving spaces such that said T-shaped partition is level with said shoulder portion, said shoulder portion and said T-shaped partition being provided with a plurality of through holes; and an elastic body made of a plastic material which is less rigid than the plastic material of which said main body is made, said elastic body being filled in said shock-absorbing area by molding such that said elastic body is anchored securely in said through holes, and that said elastic body covers said shoulder portion and a top and a bottom of said partition.

2. The base as defined in claim 1, wherein said shock-absorbing area is provided on an underside thereof with a protruded edge circumventing a periphery thereof.

3. A base of a bicycle saddle, said base comprising:

a main body made of a rigid plastic material and provided with a front end and a rear end which is wider than said front end whereby said rear end is provided with a shock-absorbing area, said shock-absorbing area having two receiving spaces, a shoulder portion circumventing said receiving spaces such that said shoulder portion is beneath the level of a top of said shock-absorbing area, and a partition located between two receiving spaces such that a top of said partition is level with said shoulder portion, said shoulder portion and said partition being provided with a plurality of through holes;

an elastic body made of a plastic material which is less rigid than the plastic material of which said main body is made, said elastic body being filled in said shock-absorbing area by molding such that said elastic body is securely anchored in said through holes, and that said elastic body covers said shoulder portion and a top and a bottom of said partition; and said shock-absorbing area is provided in an underside thereof with a protruded edge circumventing a periphery thereof.

* * * * *